US010530980B2

(12) United States Patent
Kim et al.

(10) Patent No.: US 10,530,980 B2
(45) Date of Patent: Jan. 7, 2020

(54) APPARATUS FOR MANAGING VIDEO DATA AND METHOD THE SAME

(71) Applicant: Vault Micro, Inc., Seoul (KR)

(72) Inventors: Seong Il Kim, Seoul (KR); Yong Hoon Kim, Osan (KR)

(73) Assignee: VAULT MICRO, INC., Seoul (KR)

( * ) Notice: Subject to any disclaimer, the term of this patent is extended or adjusted under 35 U.S.C. 154(b) by 0 days.

(21) Appl. No.: 15/318,392

(22) PCT Filed: Nov. 16, 2016

(86) PCT No.: PCT/KR2016/013227
§ 371 (c)(1),
(2) Date: Dec. 13, 2016

(87) PCT Pub. No.: WO2018/066750
PCT Pub. Date: Apr. 12, 2018

(65) Prior Publication Data
US 2019/0215435 A1    Jul. 11, 2019

(30) Foreign Application Priority Data

Oct. 4, 2016    (KR) ........................ 10-2016-0127640

(51) Int. Cl.
*H04N 5/232* (2006.01)
*G06F 16/783* (2019.01)
(Continued)

(52) U.S. Cl.
CPC ........... *H04N 5/23203* (2013.01); *G06F 9/44* (2013.01); *G06F 16/71* (2019.01); *G06F 16/783* (2019.01);
(Continued)

(58) Field of Classification Search
CPC ....... H04N 19/423; G06T 1/60; G06F 12/084; G06F 12/0875; G06F 9/544;
(Continued)

(56) References Cited

U.S. PATENT DOCUMENTS 6,549,948 B1 * 4/2003 Sasaki .................... H04N 7/152
348/E7.084
9,697,629 B1 * 7/2017 Vetter ..................... G06T 11/60
(Continued)

FOREIGN PATENT DOCUMENTS

KR    10-2011-0027950    3/2011
KR    10-2011-0090653    8/2011
(Continued)

*Primary Examiner* — Haixia Du
(74) *Attorney, Agent, or Firm* — Lex IP Meister, PLLC

(57) ABSTRACT

Provided is an apparatus for managing image data, by which the image data transferred to a mobile device from an image capturing device connected to the mobile device is managed. The apparatus may include a first controller located in a native layer for communicating with a java layer, a second controller located in a java layer for communicating with the native layer, and a plurality of ring-buffer type shared memories in which the image data transferred from the image capturing device is stored. The first controller may store the image data in the shared memory at a first state according to the order of the shared memories and may change the state information of the shared memory to a second state when the image data is completely stored. The second controller may read the image data stored in the shared memories at the second state according to the order of the shared memories and may change the state information of the shared memory to the first state when the image data is completely read.

14 Claims, 6 Drawing Sheets

(51) Int. Cl.
  *G06F 9/44*    (2018.01)
  *G06F 16/71*   (2019.01)
  *H04N 5/247*   (2006.01)
  *H04N 5/76*    (2006.01)
  *H04N 5/77*    (2006.01)

(52) U.S. Cl.
  CPC .............. *H04N 5/247* (2013.01); *H04N 5/76*
          (2013.01); *H04N 5/77* (2013.01)

(58) Field of Classification Search
  CPC ............ G06F 13/1663; G05B 19/0421; G05B
      2219/2205; G05B 2219/2208; G05B
      2219/2227; G05B 2219/34069; G05B
                  2219/1205
  See application file for complete search history.

(56)          References Cited

U.S. PATENT DOCUMENTS

| | | | |
|---|---|---|---|
| 2007/0028859 | A1  | 2/2007  | Franke et al. |
| 2008/0047005 | A1* | 2/2008  | Urata ................. G06F 9/526 |
| | | | 726/21 |
| 2012/0084517 | A1* | 4/2012  | Post ................. G06F 9/45541 |
| | | | 711/153 |
| 2016/0019100 | A1* | 1/2016  | Xu ..................... G06F 12/1466 |
| | | | 718/106 |
| 2017/0295112 | A1* | 10/2017 | Cheng ................ H04L 12/6418 |

FOREIGN PATENT DOCUMENTS

| | | |
|---|---|---|
| KR | 10-2012-0100358 | 9/2012 |
| KR | 10-2013-0091104 | 8/2013 |

\* cited by examiner

APPARATUS FOR MANAGING VIDEO DATA AND METHOD THE SAME

CROSS-REFERENCE TO RELATED PATENT APPLICATION

This application claims the benefit of Korean Patent Application No. 10-2016-0127640, filed on Oct. 4, 2016, in the Korean Intellectual Property Office, the disclosure of which is incorporated herein in its entirety by reference.

BACKGROUND OF THE INVENTION

1. Field of the Invention

The present invention relates to an apparatus and a method of managing image data, and more particularly, to an apparatus and a method of managing image data by which image data captured in an image capturing device connected to a mobile device may be transferred from a native layer to a java layer in the mobile device at high speed.

2. Description of the Related Art

A java language is continuously used in a mobile environment and is widely used in Connected Limited Device Configuration (CLDC) and Mobile Information Device Profile (MIDP), which are represented by java 2 Platform Micro Edition (J2ME), and Wireless Internet Platform for Interoperability (WIPI), which is Korean wireless internet standard platform.

Applications developed by a java language are generally operated on a virtual machine such as Java Virtual Machine/Kilobyte Virtual Machine (JVM/KVM) and thus, are stable in a mobile environment such as a smart phone. Also, a java language may be used easier than a C/C++ language and an assembly language and thus, is preferred by many developers. Accordingly, a java language is widely used in a mobile environment. In currently released smart phones, applications used by java language are used and thus, a use of a java language is gradually expanded in a mobile environment.

In android system, a java layer and a native layer are areas where programs created by using each different programming language are respectively run, and both layers may not be directly communicated with each other. Accordingly, a Java Native Interface (JNI) framework is provided in an android system for both programs run in a java layer and a native layer to interwork with each other.

A basic method of transferring data in the JNI is copying memories. Memory areas located in the java layer may not be accessed from the native layer and memory areas located in the native layer may not be accessed from the java layer. Thus, when data such as image data is to transfer to applications, image data received in the memory areas of the native layer is stored and then, is copied to the memory areas of the java layer. That is, in the conventional art, in order to transfer image data, which is transferred to a mobile device from an image capturing device connected to the mobile device, to applications, the image data received in the memory areas of the native layer is written and read. Then, the read data is stored again in the memory areas of the java layer and then, is read, thereby transferring the image data to the applications.

However, when the data is transferred from the native layer to the java layer by using the method above, a transfer rate is very slow and thus, images captured by the image capturing device such as a video camera may not be actually used in applications. Even if the images are played, a disconnection may occur. That is, a USB Host Application Programming Interface (API) set is provided from a java for controlling devices connected by a USB. However, when large data such as a USB Video Class (UVS) camera device is generated, 3 frames per second may not be transferred at SD resolution (640×480, MJPEG (Motion JPEG) compression) due to a data loss and delay. Such a problem occurs due to a limit of a maximum buffer size and a transfer delay occurring between the java layer and the native layer. Since the image data of above 24 frames per second makes users watch images naturally, a camera device with a transfer rate of 3 frames per second may not be actually used.

SUMMARY OF THE INVENTION

The present invention provides an apparatus and a method of managing image data by which image data captured in an external photographing device may be transferred from a native layer to a java layer in a mobile device at high speed.

According to an aspect of the present invention, there is provided an apparatus for managing image data, by which the image data transferred to a mobile device from an image capturing device connected to the mobile device is managed. The apparatus may comprise a first controller located in a native layer for communicating with a java layer, a second controller located in a java layer for communicating with the native layer and a plurality of ring-buffer type shared memories in which the image data transferred from the image capturing device is stored, wherein the first controller stores the image data in corresponding shared memories by a frame unit according to the order of the shared memories, stores the image data transferred from the image capturing device in the shared memory in a frame unit only when state information of the shared memory is at a first state, and changes the state information of the shared memory to a second state when the image data in a frame unit is completely stored in each of the shared memories, and wherein the second controller reads the image data stored in the shared memories according to the order of the shared memories only when the state information of the shared memory is at a second state and changes the state information of the shared memory to the first state when the image data stored in the shared memories is completely read.

Wherein the first controller transfers a generation request signal to the second controller for requesting generation of the shared memory, when the image data to be stored in the shared memory is received, however, the shared memory at the first state does not exist, and wherein when the second controller receives the generation request signal, the second controller additionally generates the shared memory, sets the generated shared memory next to the last shared memory, designates state information of the additionally generated shared memory as the first state, and transfers the information of the additionally generated shared memory to the first controller.

Wherein when it is recognized that the image capturing device is connected to the mobile device or when the image data is received from the image capturing device connected to the mobile device, the first controller transfers the generation request signal to the second controller for requesting generation of at least one shared memory and wherein when the second controller receives the generation request signal, the second controller generates the at least one shared memory, designates the information of the at least one shared memory as the first state, and transfers the information of the at least one shared memory to the first controller.

Wherein the generation request signal comprises information about a frame size of the image data and wherein the second controller generates the shared memory having a size larger than the frame size by using the information about a frame size of the image data and transfers information of the shared memory comprising address information and the state information of the generated shared memory.

Wherein the first controller transfers a completion signal when the image capturing device connected to the mobile device is separated from the mobile device or the image data is not received from the image capturing device, and wherein the second controller releases areas set as the shared memories when the completion signal is received.

The apparatus further comprises an abstract unit which locates in the native layer, comprises a file descriptor that may be exclusively accessible to the image capturing device, determines connection of the image capturing device and manages the access authority of the image capturing device, a library which locates in the native layer and comprises functions for controlling the image capturing device and an apparatus controller which locates in the native layer, transfers the image data received from the image capturing device to the first controller, calls the functions of the library and thus, controls a function of the image capturing device.

According to another aspect of the present invention, a method of managing image data, by which the image data transferred to a mobile device from an image capturing device connected to the mobile device is managed. The method comprise when it is recognized that the image capturing device is connected to the mobile device or when the image data is received from the image capturing device connected to the mobile device, in a first controller located in a native layer, setting the number of shared memories by using information of the image capturing device or information of the image data and transferring a generation request signal to a second controller located in a java layer for requesting generation of the set number of the shared memories, when the generation request signal is received, in the second controller, generating ring-buffer type shared memories, setting the order of the shared memories, designating state information of the shared memories as a first state, and transferring information of each of the shared memories to the first controller, only when the state information of the shared memory is at the first state, in the first controller, storing the image data in a frame unit transferred from the image capturing device in each corresponding shared memory according to the order of the shared memories and changing the state information of the shared memories to a second state when the image data in a frame unit is completely stored in each of the shared memories and only when the state information of the shared memories is at the second state, in the second controller, reading the image data stored in the shared memories according to the order of the shared memories and changing the state information of the shared memories to the first state when the image data stored in the shared memories is completely read.

The method further comprises in the first controller, transferring a generation request signal to the second controller for requesting generation of the shared memory, when the image data to be stored in the shared memory is received, however, the shared memory at the first state does not exist and in the second controller, when the generation request signal is received, additionally generating the shared memory, setting the generated shared memory next to the last shared memory, designating state information of the additionally generated shared memory as the first state, and transferring the information of the additionally generated shared memory to the first controller.

According to another aspect of the present invention, a method of managing image data, by which the image data transferred to a mobile device from an image capturing device connected to the mobile device is managed. The method comprise in a first controller located in a native layer, only when the state information of the shared memory is at the first state, storing the image data in a frame unit transferred from the image capturing device in each corresponding shared memory according to the order of the shared memories and changing the state information of the shared memories to a second state when the image data in a frame unit is completely stored in each of the shared memories, in a second controller located in a java layer, only when the state information of the shared memories is at the second state, reading the image data stored in the shared memories according to the order of the shared memories and changing the state information of the shared memories to the first state when the image data stored in the shared memories is completely read, in the first controller, transferring a generation request signal to the second controller for requesting generation of the shared memory, when the image data to be stored in the shared memory is received, however, the shared memory at the first state does not exist and in the second controller, when the generation request signal is received, additionally generating the shared memory, setting the generated shared memory next to the last shared memory, designating state information of the additionally generated shared memory as the first state, and transferring the information of the additionally generated shared memory to the first controller.

The method further comprises when it is recognized that the image capturing device is connected to the mobile phone or when the image data is received from the image capturing device connected to the mobile device, in the first controller, transferring a generation request signal to the second controller for requesting generation of the shared memory; and when the generation request signal is received, in the second controller, generating the shared memory, designating state information of the shared memory as the first state, and transferring the information of the shared memory to the first controller.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
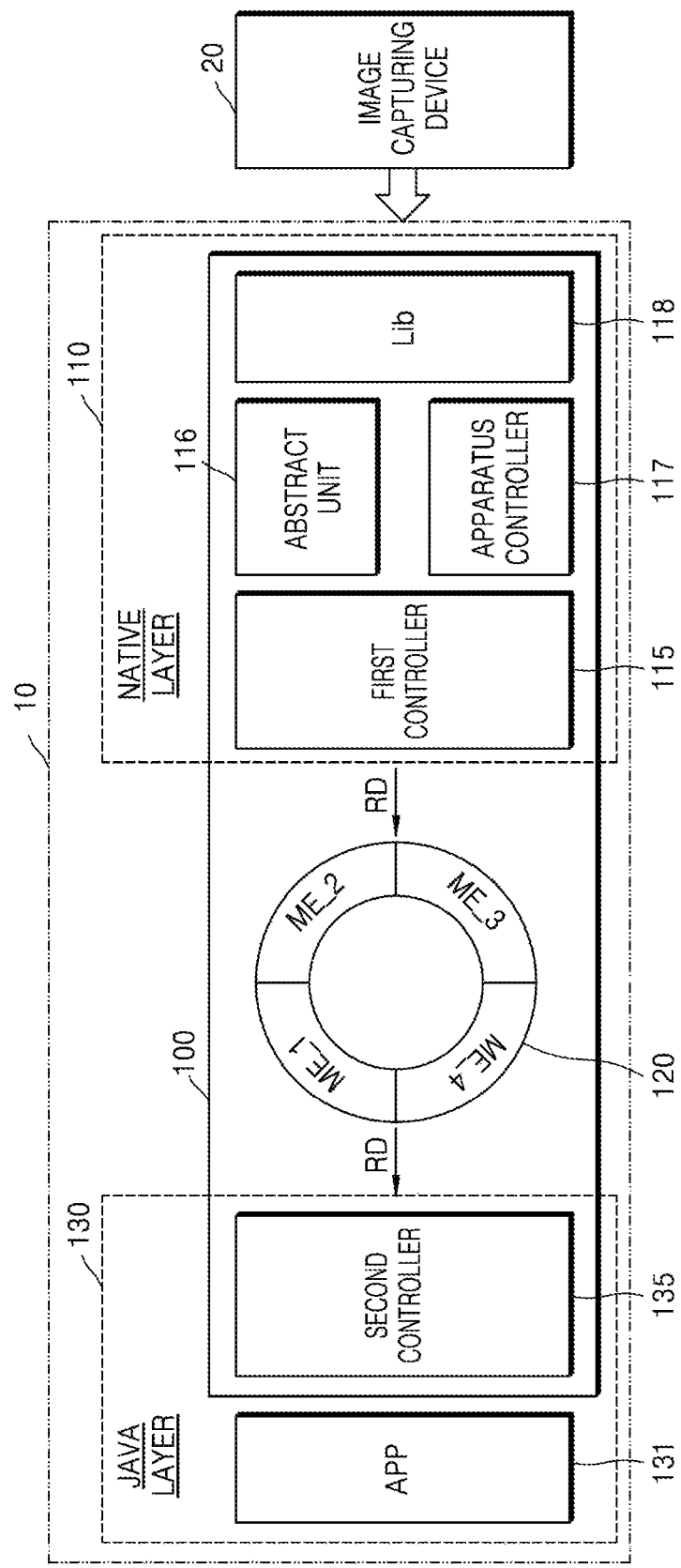
FIG. 1 is a block diagram of an apparatus of managing image data according to an embodiment of the present invention.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 2:
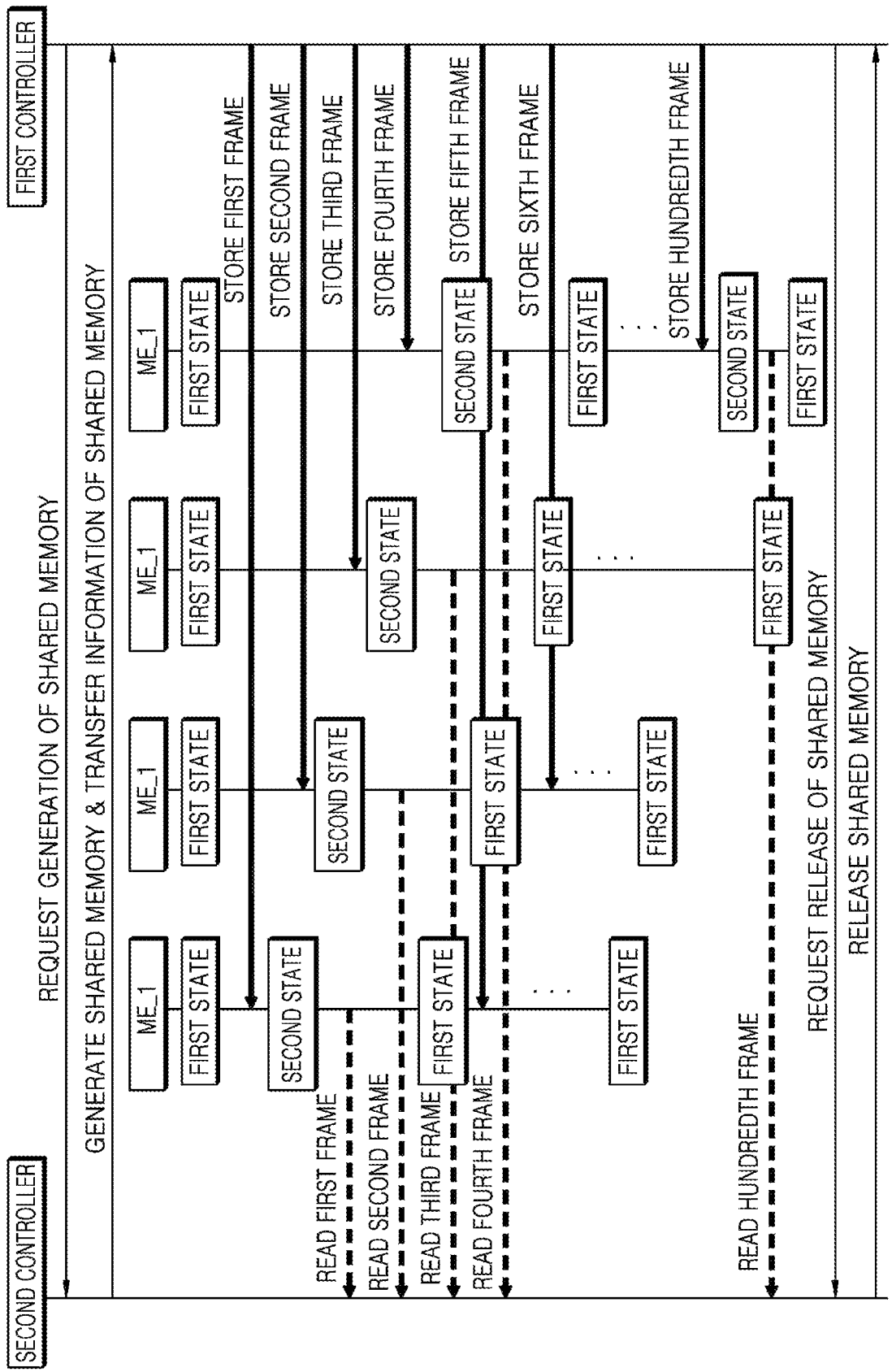
FIG. 2 illustrates operation of the apparatus of managing image data of FIG. 1 according to an embodiment of the present invention.
Figure 3:
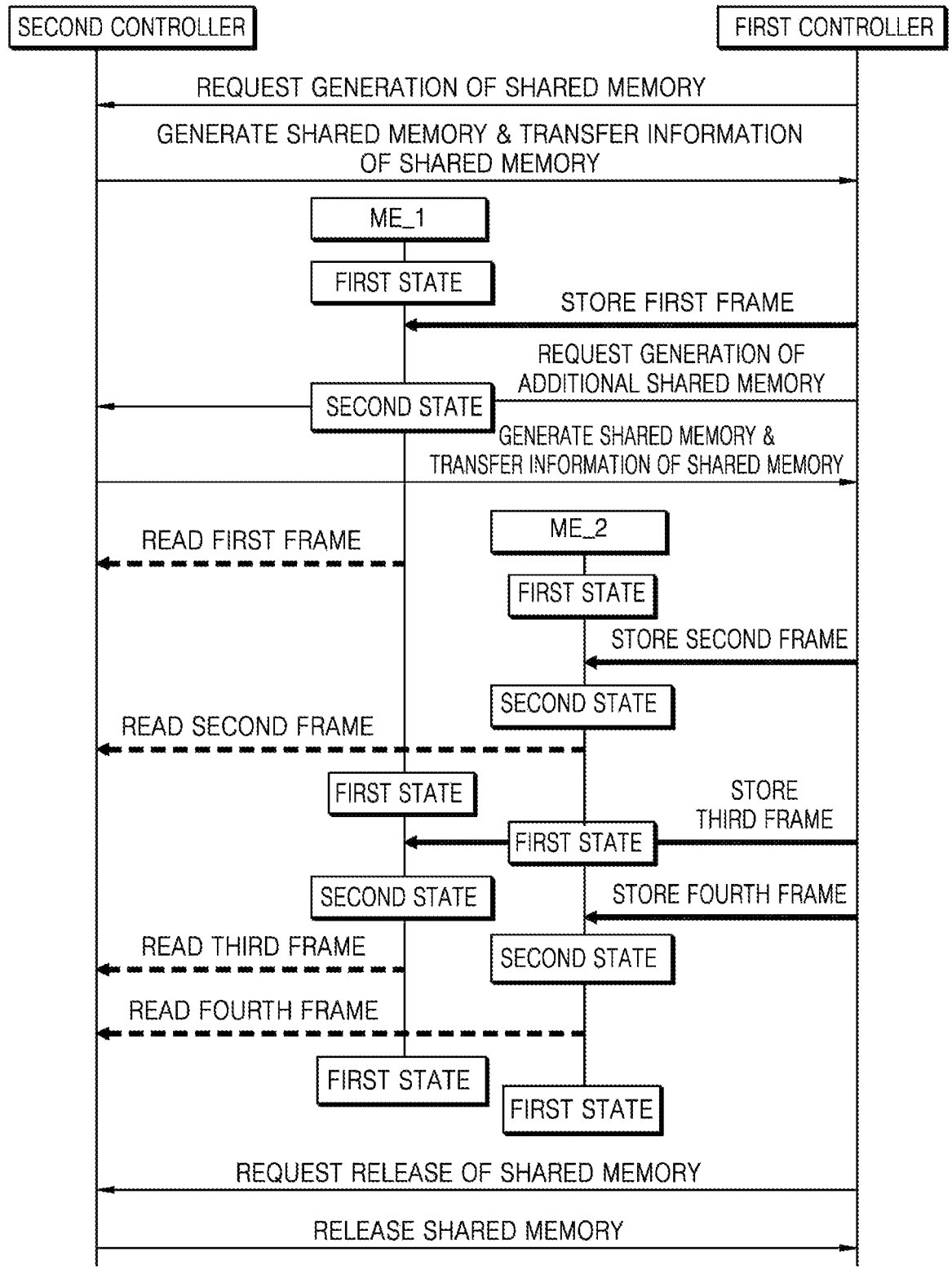
FIG. 3 illustrates operation of the apparatus of managing image data of FIG. 1 according to another embodiment of the present invention.

FIG. 1 is a block diagram of an apparatus 100 of managing image data according to an embodiment of the present invention, FIG. 2 illustrates operation of the apparatus 100 of managing image data of FIG. 1 according to an embodiment of the present invention, and FIG. 3 illustrates operation of the apparatus 100 of managing image data of FIG. 1 according to another embodiment of the present invention.

Referring to FIGS. 1 through 3, the apparatus 100 of managing image data may manage image data transferred from an image capturing device 20. The image capturing device 20 is connected to a mobile device 10 by using, for example, a Universal Serial Bus (USB). Image data captured from the image capturing device 20 is transferred to the mobile device 10 through USB, and the image data transferred to the mobile device 10 is transferred from a native layer 110 to a java layer 130 in the apparatus 100 of managing image data, which will be described in detail below, at high speed. Accordingly, an application 131 may be stably operated. That is, the apparatus 100 of managing image data may be included in the mobile device 10 and an operation system of the mobile device 10 may be Android.

The apparatus 100 of managing image data may include a first controller 115, a second controller 135, a plurality of shared memories 120, an abstract unit 116, an apparatus controller 117, and a library 118. The first controller 115 locates in the native layer 110 and may communicate with the java layer 130. Also, as described below, the first controller 115 may store image data in the shared memories 120.

The second controller 135 locates in the java layer 130 and may communicate with the native layer 110. Also, as described below, the second controller 135 may read the image data stored in the shared memories 120 and may transfer the read data to the application 131.

The plurality of shared memories 120 may store the image data transferred from the image capturing device 20 and may be a ring-buffer type. Although, the shared memories are not physically connected to each other, it is assumed that the shared memories are virtually connected to each other and the ring-buffer is a structure in which data may be sequentially transferred. The image data may be stored in each of the shared memories 120 (a first shared memory ME_1, a second shared memory ME_2, a third shared memory ME_3, and a fourth shared memory ME_4) in a frame unit. For example, it is assumed that the image data is stored in a frame unit in the order of the first shared memory ME_1, the second shared memory ME_2, the third shared memory ME_3, and the fourth shared memory ME_4. When image data having four frames is stored, a first frame may be stored in the first shared memory ME_1, a second frame may be stored in the second shared memory ME_2, a third frame may be stored in the third shared memory ME_3, and a fourth frame may be stored in the fourth shared memory ME_4. A method of storing the image data in shared memories will be described in detail below with reference to related elements. In FIG. 1, it is illustrated that the apparatus 100 of managing image data includes four shared memories ME_1, ME_2, ME_3, and ME_4. However, the number of shared memories is not limited thereto and may vary, if needed.

Areas to be used as the shared memories may be set to specific areas whether the image capturing device 20 is connected to the mobile device 10. Also, when the image capturing device 20 is connected to the mobile device 10 or when the image data is received in the mobile device 10, areas to be used as the shared memories may be set and then released. For example, when the image capturing device 20 is connected to the mobile device 10 or when the image data is received in the mobile device 10 from the image capturing device 20, information of the image capturing device 20 or information of the image data to be transferred from the image capturing device 20 may be used to set areas to be used as the shared memories 120. In addition, a number of the shared memories may be determined by using information of the image capturing device 20 or information of the image data to be transferred to the mobile device 10. The number of the shared memories may be added, if needed, or may be partly released. Also, when the image capturing device 20 connected to the mobile device 10 is separated from the mobile device 10 or the image data is not received from the image capturing device 20, areas set as the shared memories 120 may be released. This will be described in detail below.

The first controller 115 may store the image data in a frame unit according the corresponding shared memories in the order of the first shared memory ME_1, the second shared memory ME_2, the third shared memory ME_3, and the fourth shared memory ME_4. In this case, the first controller 115 may store the image data transferred from the image capturing device 20 in the shared memory in a frame unit only when state information of the shared memory is a first state. Also, the first controller 115 may change the state information of the shared memory, in which the image data in a frame unit is completely stored, from the first state to a second state.

The second controller 135 may read the image data stored according to the order of the first shared memory ME_1, the second shared memory ME_2, the third shared memory ME_3, and the fourth shared memory ME_4. In this case, the second controller 135 may read the image data stored in the shared memory only when state information of the shared memory is the second state. Also, the second controller 135 may change the state information of the shared memory from the second state to the first state when the image data stored in the shared memory is completely read.

The state information informs of a state whether the image data may be stored in the shared memory or whether the image data stored in the shared memory may be read. When the state information of the shared memory is the first state, it denotes that the image data may be stored in the shared memory. When the state information of the shared memory is the second state, it denotes that the image data stored in the shared memory may be read. For example, when a bit that designates the state information in the shared memory is '0' and '1', it may be designated as the first state and the second state, respectively.

The abstract unit 116 locates in the native layer 110 and includes a file descriptor which may be exclusively accessible to the image capturing device 20. Also, the abstract unit 116 may determine connection of the image capturing device 20 and manage the access authority of the image capturing device 20. That is, the abstract unit 116 is an abstract class of the image capturing device 20 and a file descriptor, which may be exclusively accessible to the image capturing device 20, may exist in the abstract class. All control commands about the image capturing device 20 may be internally processed by reading/writing to the file descriptor. When the image capturing device 20 is connected to the mobile device 10, the first controller 115 may generate the abstract unit 116 in corresponding to the connected image capturing device 20. When a plurality of image capturing devices is connected to the mobile device 10, the first controller 115 may separately generate the abstract unit 116 in corresponding to each of the connected image capturing devices.

The library 118 locates in the native layer 110 and may include functions for controlling the image capturing device 20.

The apparatus controller 117 locates in the native layer 110 and transfers the image data received from the image capturing device 20 to the first controller 115. Also, the apparatus controller 117 may call the functions of the library 118 and thus, control a function of the image capturing device 20. That is, when an command input into the application 131 is to control the function of the image capturing device 20, the second controller 135 transfers the command to the first controller 115, the first controller 115 transfers the command to the apparatus controller 117 through the abstract unit 116, and the apparatus controller 117 calls the function that corresponds to the received command from the library 118, thereby controlling the function of the image capturing device 20. For example, a format list (for example, resolution and frame per second (FPS)) provided from the image capturing device 20 is acquired and transferred to the java layer 130. Then, data input by a user may be received through the application 131 and a format may be changed. In addition, when the image capturing device 20 is a camera, extension functions such as video focusing mode conversion, exposure, zoom, pan&tilt, aperture, brightness, chroma, contrast, gamma, and white balance may be realized. The apparatus controller 117 also transfers the image data received from the image capturing device 20 to the first controller 115. When the image capturing device 20 is connected to the mobile device 10, the first controller 115 may generate the apparatus controller 117 in corresponding to the connected image capturing device 20. When a plurality of image capturing devices is connected to the mobile device 10, the first controller 115 may separately generate the apparatus controllers 117 in corresponding to each of the connected image capturing devices.

Hereinafter, elements included in the apparatus 100 of managing image data will be described in more detail with reference to FIGS. 1 through 3. FIG. 2 illustrates that a ring-buffer type shared memory is set and then image data is stored and FIG. 3 illustrates addition of shared memories if needed.

Referring to FIGS. 1 and 2, when it is realized that the image capturing device 20 is connected to the mobile device 10 or when image data is received from the image capturing device 20 connected to the mobile device 10, the first controller 115 may. In this case, the first controller 115 may set the number of the shared memories by using information of the image capturing device 20 or information of the image data and transfer a generation request signal to the second controller 135 for requesting generation of the set number of the shared memories. That is, the first controller 115 may set the number of the shared memories by considering a size of one frame of the image data, transfer rate of frames of the image data, time needed to store one frame in the shared memory, and time needed to read the frame stored in the shared memory so that the image data may be easily stored in the shared memory in a frame unit. Connection of the image capturing device 20 to the mobile device 10 may be determined in the first controller 115 or the abstract unit 116. The generation request signal may include information about a frame size of the image data. Hereinafter, for convenience of description, it is assumed that four shared memories are used to stably transfer the image data.

When the generation request signal is received, the second controller 135 may generate ring-buffer type shared memories ME_1, ME_2, ME_3, and ME_4 and set order of the shared memories. That is, the second controller 135 may set areas to be used as the shared memories in response to the generation request signal, for example, an address of each of the areas to be used as the shared memories. When the generation request signal includes information about a size of the frame, the second controller 135 may use the information to generate the shared memory having a size larger than the frame size. The image data may be stored in the shared memories 120 in a frame unit, however, the present invention is not limited thereto. As described below, the shared memories may be each set in a unit other than a frame unit, if the apparatus 100 of managing image data may be operated, and image data may be stored in each of the shared memories. Also, the second controller 135 may be set the order that the image data is stored in the shared memories ME_1, ME_2, ME_3, and ME_4 in advance. Hereinafter, for convenience of description, it is assumed that image data is stored in a frame unit according to the order of the first shared memory ME_1, the second shared memory ME_2, the third shared memory ME_3, and the fourth shared memory ME_4.

The second controller 135 designates state information of the shared memories ME_1, ME_2, ME_3, and ME_4 as the first state and thus may indicate a state that the image data may be stored in the shared memories. The second controller 135 may transfer information of each of the shared memories ME_1, ME_2, ME_3, and ME_4 to the first controller 115. The information of each of the shared memories ME_1, ME_2, ME_3, and ME_4 may include address information and the state information of each of the generated shared memories.

As above, a case, when areas of the shared memories are not set, is described. However, when the shared memories are already set, the image capturing device 20 may skip operation of setting the shared memories, which is described above, and may only perform operation of transferring the image data, which will be described below.

FIG. 2 illustrates that image data having 100 frames is transferred from the image capturing device 20 and the image data is stored in each of the shared memories in a frame unit. Hereinafter, transferring of the image data including 100 frames is described. However, the present invention is not limited thereto. Transferring of image data including different number of frames or storing of image data in shared memories in a different unit may be operated in a same manner as described below.

Here, new image data is received. Accordingly, the state information of the first shared memory ME_1, the second shared memory ME_2, the third shared memory ME_3, and the fourth shared memory ME_4 maintains the first state and thus, the first controller 115 stores a first frame of the image data transferred to the mobile device 10 in the first shared memory ME_1. When the first controller 115 completely stores the first frame in the first shared memory ME_1, the first controller 115 changes the state information of the first shared memory ME_1 from the first state to the second state. Since the state information of the first shared memory ME_1 is changed to the second state, the second controller 135 reads the first frame stored in the first shared memory ME_1. When the second controller 135 completely reads the first frame stored in the first shared memory ME_1, the second controller 135 changes the state information of the first shared memory ME_1 from the second state to the first state.

When the first controller 115 completely stores the first frame in the first shared memory ME_1 and changes the state information of the first shared memory ME_1 to the second state, the first controller 115 may not wait for the state information of the first shared memory ME_1 to be changed to the first state again and instead, may directly store a second frame in the second shared memory ME_2 at the first state. When the first controller 115 completely stores the second frame in the second shared memory ME_2, the first controller 115 may change the state information of the second shared memory ME_2 from the first state to the second state. Since the state information of the second shared memory ME_2 is changed to the second state, the second controller 135 completely reads the first frame stored in the first shared memory ME_1 and then reads the second frame stored in the second shared memory ME_2. When the second controller 135 completely reads the second frame stored in the second shared memory ME_2, the second controller 135 changes the state information of the second shared memory ME_2 from the second state to the first state.

As in the same manner, when the first controller 115 completely stores the second frame, the first controller 115 stores a third frame in the third shared memory ME_3. Also, when the first controller 115 completely stores the third frame, the first controller 115 stores a fourth frame in the fourth shared memory ME_4 at the first state. When the first controller 115 completely stores the fourth frame and changes the state information of the fourth shared memory ME_4 to the second state, the first controller 115 checks whether the first shared memory ME_1 is at the first state. When the first shared memory ME_1 is at the first state, the first controller 115 stores a fifth frame in the first shared memory ME_1. Even if the first shared memory ME_1 is at the second state after the first controller 115 completely stores the fourth frame and the state information of the fourth shared memory ME_4 is changed to the second state, the first controller 115 may request the second controller 135 to additionally generate the shared memory. That is, when data to be stored in the shared memory is received, however, there is no shared memory at the first state, the first controller 115 may request the second controller 135 for additional generation of the shared memory. Such a case will be described in detail below with reference to FIG. 3.

As in the same manner, when the second controller 135 completely reads the second frame, the second controller 135 reads the third frame from the third shared memory ME_3 at the second state. When the third frame is completely read, the second controller 135 reads the fourth frame from the fourth shared memory ME_4 at the second state. When the second controller 135 completely reads the fourth frame and changes the state information of the fourth shared memory ME_4 to the first state, the second controller 135 checks whether the first shared memory ME_1 is at the second state. When the first shared memory ME_1 is at the second state, the second controller 135 reads the fifth frame from the first shared memory ME_1.

Since the operations above are repeatedly performed up to 100 frames, 100 frames are all transferred from the first controller 115 to the second controller 135 and the second controller 135 may transfer each read frame to the application 131.

For convenience of description, it is illustrated above that only a frame is stored in each of the shared memories. However, the present invention is not limited thereto and related information other than image data in a frame unit may be stored. For example, the first controller 115 may store at least one of timestamp information, size information, resolution information, format information, sample rate information, bit information, and channel number information of the image data in a frame unit in the shared memories with the image data in a frame unit and the second controller 135 may read all data stored in the shared memories.

When the image capturing device 20 connected to the mobile device 10 is separated from the mobile device 10 or when the image data is not received in the image capturing device 20, the first controller 115 may transfer a completion signal to the second controller 135 for requesting a release of the shared memories 120. Whether the image capturing device 20 is separated from the mobile device 10 may be determined in the first controller 115 or the abstract unit 116. When the second controller 135 receives the completion signal, areas set as the shared memories may be released and the release of the areas may be informed to the first controller 115. Also, if needed, the first controller 115 may transfer the completion signal to the second controller 135 for requesting a release of a part of the shared memories. For example, when a size or transmission rate of the image data received in the mobile device is changed and thus a part of the shared memories is not used so that a high-speed transfer is available, a part of the shared memories may be released.

Next, storing of the image data in the shared memories and then additionally generating of the shared memories will be described with reference to FIGS. 1 through 3. Descriptions overlapped with that of illustrated with reference to FIGS. 1 and 2 are replaced with the description of FIGS. 1 and 2. When the first shared memory ME_1 is set, it indicates that new image data is received and thus the state information of the first shared memory ME_1 maintains the first state. Accordingly, the first controller 115 stores the first frame of the image data transferred to the mobile device 10 in the first shared memory ME_1. When the first controller 115 completely stores the first frame in the first shared memory ME_1, the first controller 115 changes the state information of the first shared memory ME_1 from the first state to the second state. Since the state information of the first shared memory ME_1 is changed to the second state, the second controller 135 reads the first frame stored in the first shared memory ME_1. When the second controller 135 completely reads the first frame stored in the first shared memory ME_1, the second controller 135 changes the state information of the first shared memory ME_1 from the second state to the first state.

Since the first controller 115 tries to store the second frame after completely storing the first frame, however, the first shared memory ME_1 is at the second state, there is no shared memory at the first state. In this case, the first controller 115 may not wait for the state information of the first shared memory ME_1 to be changed to the first state and instead, may transfer the generation request signal to the second controller 135 for requesting generation of additional shared memories. The generation request signal may include the same information as that of described above. When the second controller 135 receives the generation request signal, the second controller 135 may set the order of the second shared memory ME_2 as the next of a last shared memory while additionally generating the second shared memory ME_2. Since only the first shared memory ME_1 exists at present, the second shared memory ME_2 is set next to the first shared memory ME_1. If additional shared memory is to be set after setting the second shared memory ME_2, a new shared memory will be set next to the last second shared memory ME_2. Also, the second controller 135 may designate the state information of the additionally generated second shared memory ME_2 as the first state and transfer the information of the generated second shared memory ME_2 to the first controller 115.

When the second shared memory ME_2 is generated as above, the first controller 115 may not wait for the state information of the first shared memory ME_1 to be changed to the first state and instead, may store the second frame in the second shared memory ME_2. When the second frame is completely stored, the state information of the second shared memory ME_2 is changed to the second state. Also, when the state information of the second shared memory ME_2 is changed and then the first shared memory ME_1 is at the first state, the first controller 115 stores the third frame in the first shared memory ME_1. When there is no shared memory at the first state, the first controller 115 may again request the second controller 135 for additionally generating the shared memory.

When the first frame stored in the first shared memory ME_1 is completely read and then, the state information of the second shared memory ME_2 is at the second state, the second controller 135 reads the second frame stored in the second shared memory ME_2. Then, when the second frame stored in the second shared memory ME_2 is completely read and then, the state information of the first shared memory ME_1 is at the second state, the second controller 135 reads the third frame stored in the first shared memory ME_1.

As described above, the image data transferred from the image capturing device 20 may be transferred to the application 131 at high-speed. That is, in the present invention, the number of storing and reading data may be reduced by half compared to that of in the conventional art and thus, image data may be transferred at high-speed. In the conventional art, in order to transfer an image from the native layer 110 to the java layer 130, the image data is stored in the memory located in the native layer 110 to be read and the read data is stored in the memory located in the java layer 130 to be read, thereby transferring the image to the application 131. However, in the present invention, the data stored in the shared memories are directly read from the second controller 135 and then may be transferred to the application 131. Accordingly, a high-speed transfer of the image data may be available. In order to prevent generation of bottlenecks while storing and reading the image data, a plurality of ring-buffer type shared memories is used and if needed, additional shared memories may be generated. Therefore, the image data may be transferred from the native layer to the java layer faster than in using one shared memory.

Figure 4:
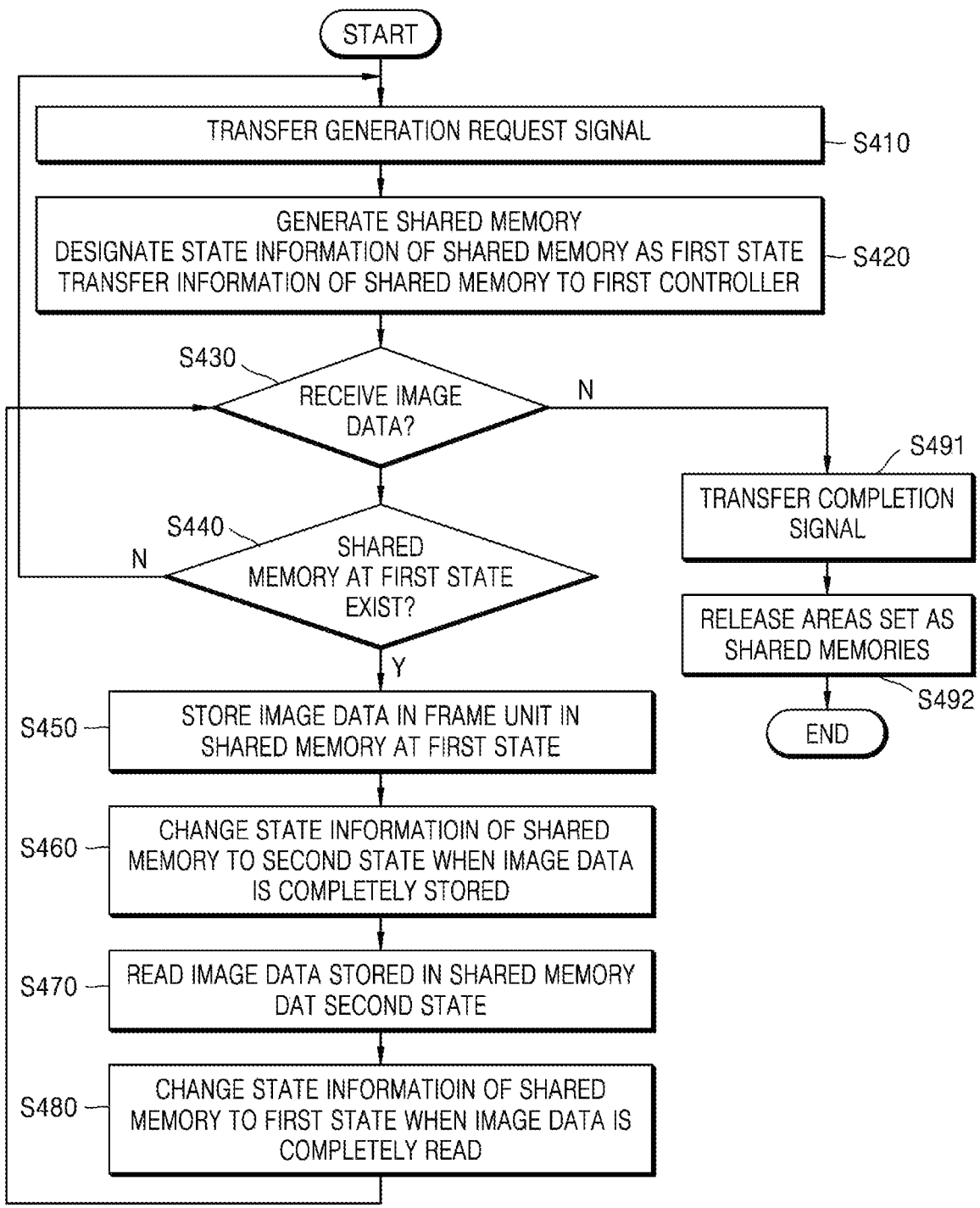
FIG. 4 is a flowchart of a method of managing image data according to an embodiment of the present invention.

FIG. 4 is a flowchart of a method of managing image data according to an embodiment of the present invention.

Hereinafter, a method of managing the image data transferred from the image capturing device 20 connected to the mobile device 10 to the mobile device 10 for managing the image data in the mobile device 10 will be described with reference to FIGS. 1 through 4. Descriptions overlapped will be replaced with the descriptions illustrated above with reference to FIGS. 1 through 3.

Firstly, when it is recognized that the image capturing device 20 is connected to the mobile device 10 or when the image data is received from the image capturing device 20 connected to the mobile device 10, information of the image capturing device 20 or information of the image data is used to set the number of shared memories in the first controller 115 located in the native layer 110 and the generation request signal for requesting generation of the set number of the shared memories is transferred to the second controller 135 located in the java layer 130, in operation S410.

In operation S420, when the generation request signal is received in the second controller 135, the second controller 135 generates ring-buffer type shared memories, sets the order of the shared memories, designates state information of the shared memories as a first state, and transfers information of each of the shared memories to the first controller 115.

Then, when the image data is transferred from the image capturing device 20 to the mobile device 10, in operation S430, the first controller 115 stores the transferred image data in each corresponding shared memory according to the order of the shared memories which are at the first state, in operation S450. The first controller 115 changes the state information of the shared memory, in which the image data is completely stored, to a second state, in operation S460. When the state information of the shared memory is changed to the second state, the second controller 135 reads the image data stored in the shared memory, in operation S470. When the image data stored in the shared memory is completely read, the state information of the shared memory is changed to the first state, in operation S480. Such operations are repeatedly performed while receiving the image data. The image data is stored in each different shared memory in a frame unit according to the order of the shared memories and then is read. For example, if there are three shared memories, the first frame is stored in the first shared memory and then, is read. The second frame is stored in the second shared memory and then, is read. The third frame is stored in the third shared memory and then, is read. The fourth frame is stored in the first shared memory again and then, is read. As above, storing and reading are performed by circulating the shared memories.

As described above with reference to FIG. 3, when the first controller 115 is to store the image data in a frame unit, however, there is no shared memory at the first state, in operation S440, the first controller 115 transfers the generation request signal to the second controller 135 for requesting generation of an additional shared memory, in operation S410. The second controller 135 additionally generates the shared memory in response to the generation request signal, sets the generated shared memory next to the last shared memory, designates the state information of the additionally generated shared memory as the first state, and transfers the information of the additionally generated shared memory to the first controller 115, in operation S420. As such, when the additional shared memory is generated, the image data in a frame unit is stored in the generated shared memory and then, is read.

When the image data is completely received and thus, is not transferred to the mobile device 10 anymore or when the image capturing device 20 connected to the mobile device 10 is separated from the mobile device 10, in operation S430, the first controller 115 transfers the completion signal to the second controller 135, in operation S491, and the second controller 135 may release areas set as the shared memories, in operation S492, when the second controller 135 receives the completion signal.

Figure 5:
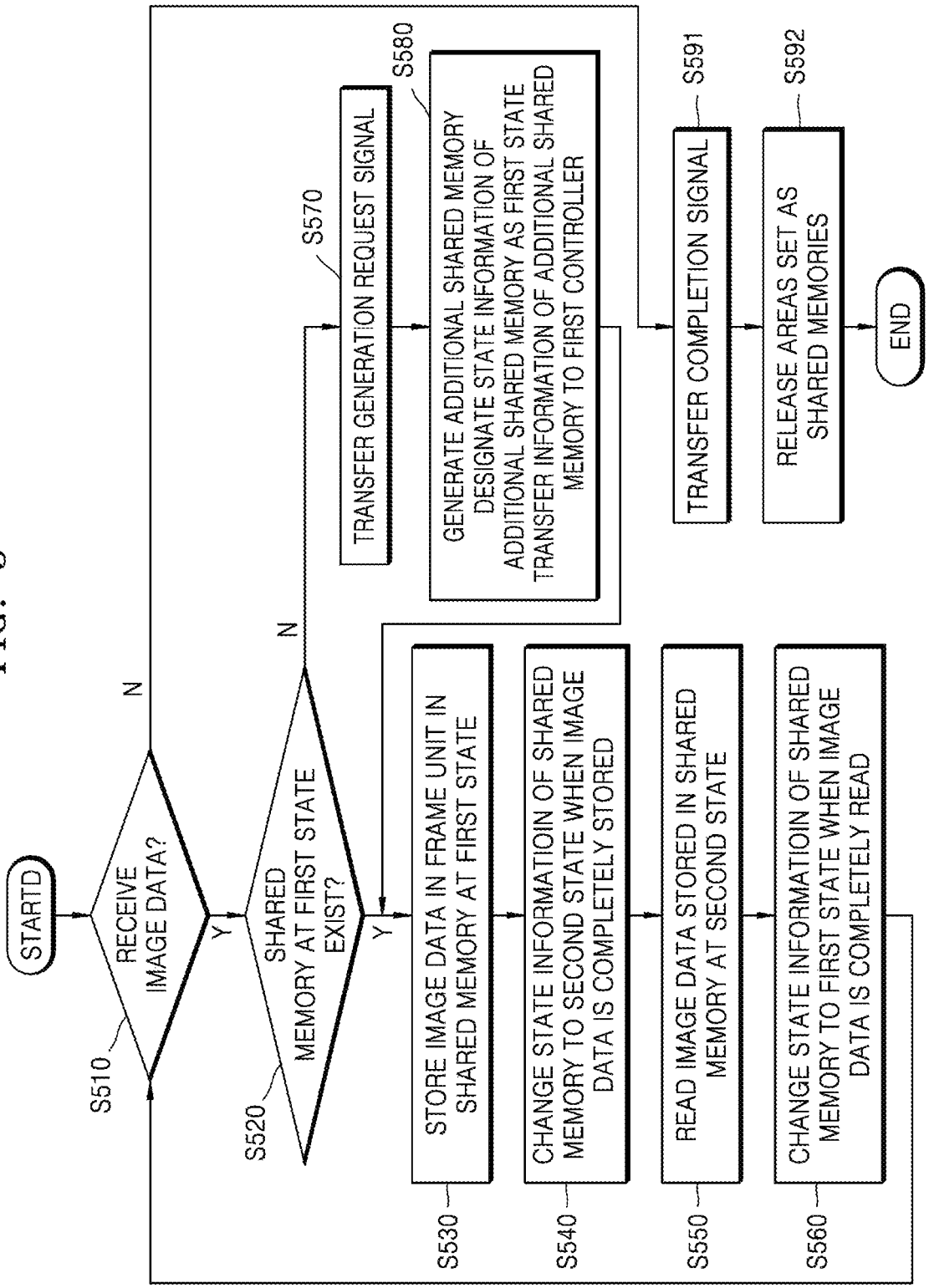
FIG. 5 is a flowchart of a method of managing image data according to an embodiment of the present invention.

FIG. 5 is a flowchart of a method of managing image data according to an embodiment of the present invention.

Hereinafter, a method of managing the image data transferred from the image capturing device 20 connected to the mobile device 10 to the mobile device 10 for managing the image data in the mobile device 10 will be described with reference to FIGS. 1 through 5. Descriptions overlapped will be replaced with the descriptions illustrated above with reference to FIGS. 1 through 4.

The image data transferred from the image capturing device 20 is received in the mobile device 10, in operation S510. When the shared memory at the first state exists, in operation S520, the first controller 115 stores the image data in a frame unit in the shared memories sequentially, in operation S530. When the image data is completely stored, the first controller 115 changes the state information of the shared memory to the second state, in operation S540. Then, the second controller 135 sequentially reads the image data in a frame unit stored in the shared memory at the second state, in operation S550, and changes the state information of the shared memory, in which reading is completed, to the first state, in operation S550.

When the shared memory at the first state does not exist, in operation S520, the first controller 115 transfers the generation request signal for requesting generation of an additional shared memory to the second controller 135, in operation S570. The second controller 135 additionally generates the shared memory in response to the generation request signal, sets the generated shared memory next to the last shared memory, designates the state information of the additionally generated shared memory as the first state, and transfers the information of the additionally generated shared memory to the first controller 115, in operation S580. As such, when the additional shared memory is generated, the image data in a frame unit is stored in the generated shared memory and then, is read When the image data is completely received and thus, is not transferred to the mobile device 10 anymore or when the image capturing device 20 connected to the mobile device 10 is separated from the mobile device 10, in operation S510, the first controller 115 transfers the completion signal to the second controller 135, in operation S591, and the second controller 135 may release areas set as the shared memories, in operation S592, when the second controller 135 receives the completion signal.

As described above, one image capturing device 20 is connected to the mobile device 10, however, the present invention is not limited thereto. When a plurality of image capturing devices 20 is connected to the mobile device 10, the same operations as described above may be also performed. Thus, the received image data may be transferred from the native layer 110 to the java layer 130 at high-speed.

Figure 6:
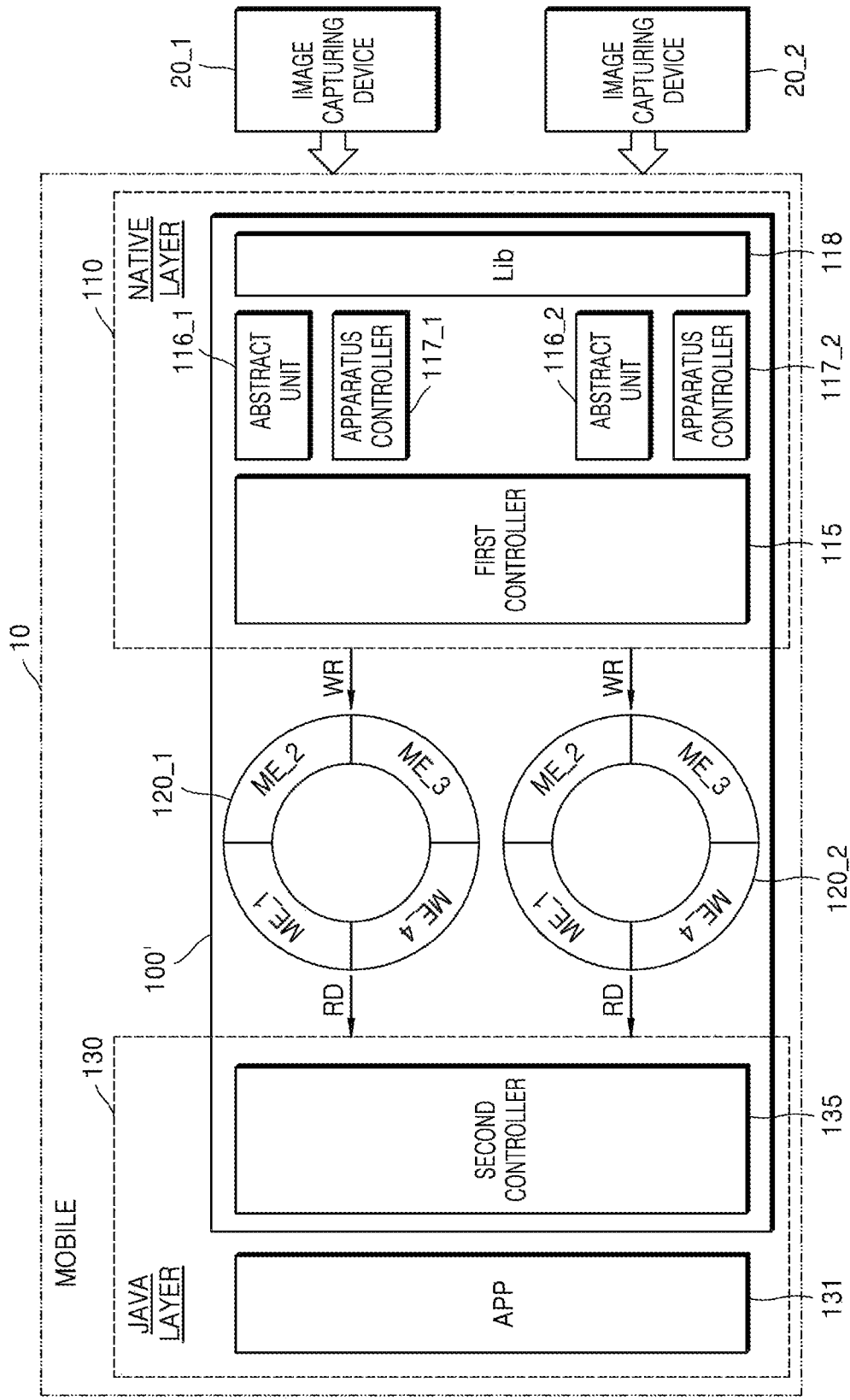
FIG. 6 is a block diagram of an apparatus of managing image data when a plurality of image capturing devices is connected to the apparatus.

FIG. 6 is a block diagram of an apparatus 100' of managing image data when a plurality of image capturing devices 20_1 and 20_2 is connected to the mobile device 10.

Referring to FIGS. 1 through 6, when the plurality of image capturing devices 20_1 and 20_2 is connected to the mobile device 10, shared memories 120_1, an abstract unit 116_1, and an apparatus controller 117_1 each corresponding to the image capturing device 20_1 may be generated, and shared memories 120_2, an abstract unit 116_2, and an apparatus controller 117_2 each corresponding to the image capturing device 20_2 may be generated. For example, the first controller 115 receives image data transferred from the image capturing device 20_1 through the apparatus controller 117_1 and the image data is stored in the shared memories 120_1. The second controller 135 recognizes that the image data read from the shared memories 120_1 is photographed in the image capturing device 20_1 and is processed. That is, when the plurality of image capturing devices 20_1 and 20_2 is connected, the shared memories, the abstract unit, and the apparatus controller are generated for each of the image capturing device. Functions of each element are the same as that of described with reference to FIGS. 1 through 5 and thus descriptions of each element will be replaced with that of described with reference to FIGS. 1 through 5.

In setting of a plurality of shared memories when the plurality of image capturing devices is connected to the mobile device 10, the first controller 115 may separately generate the generation request signal for each of the connected image capturing devices 20_1 and 20_2 and transfer the generation request signals to the second controller 135. Also, the second controller 135 may set areas to be used as the shared memories 120_1 and 120_2 for each received generation request signal. That is, the second controller 135 generates the ring-buffer type shared memories 120_1 and 120_2 for each of the plurality of image capturing devices 20_1 and 20_2 by using the received generation request signal, designates state information of the generated shared memories 120_1 and 120_2 as the first state, and transfers information of each of the shared memories 120_1 and 120_2 to the first controller 115. Also, when the plurality of image capturing devices 20_1 and 20_2 is connected to the mobile device 10, the first controller 115 may separately generate the abstract units 116_1 and 116_2 and the apparatus controllers 117_1 and 117_2 for each corresponding image capturing devices 20_1 and 20_2.

In the apparatus and the method of managing image data according to the present invention, image data transferred from an image capturing device connected to a mobile device to the mobile device may be transferred from a native layer to a java layer at high-speed and thus an image may be stably provided to an application. That is, in the conventional art, a delay may occur while transferring data from the native layer to the java layer so that only 3 frames per second is transferred. However, according to the present invention, more than 30 frames per second may be transferred so that a transfer of not only images of HD resolution (1280×720, MJPEG compression) but also images of full HD resolution (1920×1080, MJPEG compression) may be available.

In addition, although the shared memories are used, other frames may not be stored in the shared memories until storing and reading are completed and accordingly, a transfer in a frame unit may be delayed. However, in the present invention, ring-buffer type shared memories are used and thus image data may be transferred from the native layer to the java layer at high-speed without generation of bottlenecks.

Therefore, according to the present invention, a high-speed transfer of images is available so that high-definition image data or image data transferred from a plurality of image capturing devices may be used to stably run applications. Also, in the present invention, images captured by the image capturing devices may be stably played or broadcasted in real-time through the mobile device without a disconnection.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for managing image data, by which the image data transferred to a mobile device from an image capturing device connected to the mobile device is managed, the apparatus comprising:
   a first controller located in a native layer for communicating with a java layer;
   a second controller located in a java layer for communicating with the native layer;
   a plurality of ring-buffer type shared memories in which the image data transferred from the image capturing device is stored;
   an abstract unit which locates in the native layer, comprises a file descriptor that may be exclusively accessible to the image capturing device, determines connection of the image capturing device and manages the access authority of the image capturing device;
   a library which locates in the native layer and comprises functions for controlling the image capturing device; and
   an apparatus controller which locates in the native layer, transfers the image data received from the image capturing device to the first controller, calls the functions of the library and thus, controls a function of the image capturing device,
   wherein the first controller stores the image data transferred from the image capturing device in corresponding shared memories by a frame unit according to the order of the shared memories only when state information of the shared memories is at a first state, and changes the state information of the shared memories to a second state when the image data is completely stored in each of the shared memories by the frame unit, and
   wherein the second controller reads the image data stored in the shared memories according to the order of the shared memories only when the state information of the shared memories is at a second state and changes the state information of the shared memories to the first state when the image data stored in the shared memories is completely read.

2. The apparatus of claim 1, wherein the first controller transfers a generation request signal to the second controller for requesting generation of an additional shared memory, when the image data to be stored in the shared memories is received and none of the shared memories is at the first state, and wherein when the second controller receives the generation request signal, the second controller generates the additional shared memory, sets the additional shared memory next to a last of the shared memories, designates state information of the additional shared memory as the first state, and transfers the information of the additional shared memory to the first controller.

3. The apparatus of claim 1, wherein when it is recognized that the image capturing device is connected to the mobile device or when the image data is received from the image capturing device connected to the mobile device, the first controller transfers a generation request signal to the second controller for requesting generation of at least one of the shared memories and wherein when the second controller receives the generation request signal, the second controller generates the at least one of the shared memories, designates the information of the at least one of the shared memories as the first state, and transfers the information of the at least one of the shared memory to the first controller.

4. The apparatus of claim 3, wherein when a plurality of image capturing devices is connected to the mobile device, the first controller transfers the generation request signals to the second controller for each of the connected image capturing devices and wherein the second controller generates the shared memories for each of the plurality of image capturing devices by using the received generation request signals.

5. The apparatus of claim 3, wherein the generation request signal comprises information about a frame size of the image data and wherein the second controller generates the shared memories having a size larger than the frame size by using the information about a frame size of the image data and transfers information of the shared memories comprising address information and the state information of the generated shared memories.

6. The apparatus of claim 1, wherein the first controller transfers a completion signal when the image capturing device connected to the mobile device is separated from the mobile device or the image data is not received from the image capturing device, and wherein the second controller releases areas set as the shared memories when the completion signal is received.

7. The apparatus of claim 1, wherein the first controller stores at least one of timestamp information, size information, resolution information, format information, sample rate information, bit information, and channel number information of the image data in a frame unit in the shared memories with the image data in a frame unit.

8. The apparatus of claim 1, wherein when the image capturing device is connected to the mobile device, the first controller generates the abstract unit and the apparatus controller in corresponding to the connected image capturing device and when the plurality of image capturing devices is connected to the mobile device, the first controller separately generates the abstract units and the apparatus controllers in corresponding to each of the connected image capturing devices.

9. A method of managing image data, by which the image data transferred to a mobile device from an image capturing device connected to the mobile device is managed, the method comprising:
   when it is recognized that the image capturing device is connected to the mobile device or when the image data is received from the image capturing device connected to the mobile device, in a first controller located in a native layer, setting the number of shared memories by using information of the image capturing device or information of the image data and transferring a generation request signal to a second controller located in a java layer for requesting generation of the set number of the shared memories;
   when the generation request signal is received, in the second controller, generating ring-buffer type shared memories, setting the order of the shared memories, designating state information of the shared memories as a first state, and transferring information of each of the shared memories to the first controller;
   only when the state information of the shared memories is at the first state, in the first controller, storing the image data transferred from the image capturing device in each corresponding shared memories by a frame unit according to the order of the shared memories and changing the state information of the shared memories to a second state when the image data is completely stored in each of the shared memories by the frame unit;
   only when the state information of the shared memories is at the second state, in the second controller, reading the image data stored in the shared memories according to the order of the shared memories and changing the state information of the shared memories to the first state when the image data stored in the shared memories is completely read;

generating an abstract unit in the native layer for managing the access authority of the image capturing device after determining connection or separation of the image capturing device in accordance with connection of the image capturing device; and transferring the image data received from the image capturing device to the first controller, calling functions of a library and generating an apparatus controller for controlling a function of the image capturing device in accordance with connection of the image capturing device.

10. The method of claim 9, further comprising:

in the first controller, transferring a generation request signal to the second controller for requesting generation of an additional shared memory, when the image data to be stored in the shared memories is received and none of the shared memories is at the first state; and in the second controller, when the generation request signal is received, generating the additional shared memory, setting the additional shared memory next to a last of the shared memories, designating state information of the additional shared memory as the first state, and transferring the information of the additional shared memory to the first controller.

11. The method of claim 9, further comprising:

transferring a completion signal from the first controller to the second controller when the image capturing device connected to the mobile device is separated from the mobile device or the image data is not received from the image capturing device; and in the second controller, when the completion signal is received, releasing areas set as the shared memories.

12. A method of managing image data, by which the image data transferred to a mobile device from an image capturing device connected to the mobile device is managed, the method comprising:

in a first controller located in a native layer, only when the state information of the shared memories is at the first state, storing the image data transferred from the image capturing device in each corresponding shared memories by a frame unit according to the order of the shared memories and changing the state information of the shared memories to a second state when the image data is completely stored in each of the shared memories;

in a second controller located in a java layer, only when the state information of the shared memories is at the second state, reading the image data stored in the shared memories according to the order of the shared memories and changing the state information of the shared memories to the first state when the image data stored in the shared memories is completely read;

in the first controller, transferring a generation request signal to the second controller for requesting generation of an additional shared memory, when the image data to be stored in the shared memories is received and none of the shared memories is at the first state;

in the second controller, when the generation request signal is received, generating the additional shared memory, setting the additional shared memory next to a last of the shared memories, designating state information of the additional shared memory as the first state, and transferring the information of the additional shared memory to the first controller;

generating an abstract unit in the native layer for managing the access authority of the image capturing device after determining connection or separation of the image capturing device in accordance with connection of the image capturing device; and transferring the image data received from the image capturing device to the first controller, calling functions of a library and generating an apparatus controller for controlling a function of the image capturing device in accordance with connection of the image capturing device.

13. The method of claim 12, further comprising:

when it is recognized that the image capturing device is connected to the mobile phone or when the image data is received from the image capturing device connected to the mobile device, in the first controller, transferring a generation request signal to the second controller for requesting generation of the shared memories; and when the generation request signal is received, in the second controller, generating the shared memories, designating state information of the shared memories as the first state, and transferring the information of the shared memories to the first controller.

14. The method of claim 12, further comprising transferring a completion signal from the first controller to the second controller when the image capturing device connected to the mobile device is separated from the mobile device or the image data is not received from the image capturing device; and in the second controller, when the completion signal is received, releasing areas set as the shared memories.

\* \* \* \* \*